(12) United States Patent
Mankowski

(10) Patent No.: US 9,390,598 B2
(45) Date of Patent: Jul. 12, 2016

(54) THREE DIMENSIONAL HAPTICS HYBRID MODELING

(71) Applicant: BLACKBERRY LIMITED, Waterloo (CA)

(72) Inventor: Peter Mankowski, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 173 days.

(21) Appl. No.: 14/024,006

(22) Filed: Sep. 11, 2013

(65) Prior Publication Data

US 2015/0072738 A1     Mar. 12, 2015

(51) Int. Cl.
*H04M 1/00*   (2006.01)
*G08B 6/00*   (2006.01)
*G01S 15/02*  (2006.01)
*G06F 3/01*   (2006.01)

(52) U.S. Cl.
CPC . *G08B 6/00* (2013.01); *G01S 15/02* (2013.01); *G06F 3/016* (2013.01); *G06F 3/017* (2013.01); *H04M 2250/22* (2013.01)

(58) Field of Classification Search
CPC ...... G06F 3/016; G06F 3/0488; G06F 3/0416
See application file for complete search history.

(56) References Cited

U.S. PATENT DOCUMENTS

| | | |
|---|---|---|
| 6,023,277 A | 2/2000 | Osaka et al. |
| 6,064,354 A | 5/2000 | DeLuca |
| 6,559,813 B1 | 5/2003 | DeLuca et al. |
| 6,822,635 B2 | 11/2004 | Shahoian et al. |
| 7,148,875 B2 | 12/2006 | Rosenberg et al. |
| 8,063,893 B2 | 11/2011 | Rosenberg et al. |
| 8,279,168 B2 | 10/2012 | Glomski et al. |
| 8,416,187 B2 | 4/2013 | Margolis et al. |
| 8,432,390 B2 | 4/2013 | Givon |
| 8,493,354 B1 | 7/2013 | Birnbaum et al. |
| 8,494,497 B2 | 7/2013 | Seo et al. |

(Continued)

FOREIGN PATENT DOCUMENTS

| | | |
|---|---|---|
| CA | 2708673 | 12/2010 |
| EP | 2270627 A1 | 1/2011 |

(Continued)

OTHER PUBLICATIONS

Amemiya, Tomohiro, et al.; "Phantom-Drawn: Direction Guidance Using Rapid and Asymmetric Acceleration Weighted by Nonlinearity of Perception"; ICAT; 2005; 8 pages.

(Continued)

*Primary Examiner* — Edward Urban
*Assistant Examiner* — Mohammed Rachedine
(74) *Attorney, Agent, or Firm* — Conley Rose, P.C.; J. Robert Brown, Jr.

(57) ABSTRACT

A method and apparatus for producing a haptic sensation is disclosed. An acoustic transducer at a first cellular communication device is used to determine a gesture of a user object with respect to a first cellular communication device. The gesture is generally performed in a three-dimensional space of the first cellular communication device. A haptic signal is created that corresponds to the determined gesture and is sent from the first cellular communication device to a second cellular communication device. An actuator at the second cellular communication device is actuated according to the haptic signal to produce a haptic sensation at the second cellular communication device.

20 Claims, 8 Drawing Sheets

(56) References Cited

U.S. PATENT DOCUMENTS

| | | |
|---|---|---|
| 2003/0058265 A1 | 3/2003 | Robinson et al. |
| 2003/0184574 A1 | 10/2003 | Phillips et al. |
| 2005/0277448 A1 | 12/2005 | Castaneda et al. |
| 2007/0103449 A1 | 5/2007 | Laitinen et al. |
| 2007/0139391 A1 | 6/2007 | Bischoff |
| 2008/0068348 A1 | 3/2008 | Rosenberg et al. |
| 2008/0153554 A1 | 6/2008 | Yoon et al. |
| 2008/0252595 A1 | 10/2008 | Boillot |
| 2009/0018445 A1* | 1/2009 | Schers ............... A61B 8/0875 600/437 |
| 2009/0058829 A1 | 3/2009 | Kim et al. |
| 2009/0077504 A1 | 3/2009 | Bell et al. |
| 2009/0102805 A1 | 4/2009 | Meijer et al. |
| 2009/0160813 A1 | 6/2009 | Takashima et al. |
| 2009/0267892 A1 | 10/2009 | Faubert |
| 2009/0267920 A1 | 10/2009 | Faubert et al. |
| 2009/0294186 A1 | 12/2009 | Fontanella et al. |
| 2009/0322496 A1 | 12/2009 | da Costa |
| 2010/0020036 A1 | 1/2010 | Hui et al. |
| 2010/0033479 A1 | 2/2010 | Hirayama et al. |
| 2010/0066662 A1 | 3/2010 | Tomisawa et al. |
| 2010/0095206 A1* | 4/2010 | Kim ....................... G06F 3/017 715/702 |
| 2010/0110018 A1 | 5/2010 | Faubert et al. |
| 2010/0156814 A1 | 6/2010 | Weber et al. |
| 2010/0156818 A1 | 6/2010 | Burrough et al. |
| 2010/0225734 A1 | 9/2010 | Weller et al. |
| 2011/0001707 A1 | 1/2011 | Faubert et al. |
| 2011/0119639 A1* | 5/2011 | Tartz ........................... 715/863 |
| 2011/0138277 A1 | 6/2011 | Grant et al. |
| 2011/0141046 A1 | 6/2011 | Sato et al. |
| 2011/0195782 A1 | 8/2011 | Mao et al. |
| 2011/0205151 A1 | 8/2011 | Newton et al. |
| 2012/0001875 A1 | 1/2012 | Li et al. |
| 2012/0068957 A1 | 3/2012 | Puskarich et al. |
| 2012/0162384 A1 | 6/2012 | Vesely et al. |
| 2012/0229400 A1* | 9/2012 | Birnbaum ............... G06F 3/016 345/173 |
| 2012/0293513 A1 | 11/2012 | Krishnaswamy |
| 2014/0160087 A1* | 6/2014 | Mercea et al. ................. 345/179 |

FOREIGN PATENT DOCUMENTS

| | | |
|---|---|---|
| EP | 2518590 A1 | 10/2012 |
| JP | 2005258666 | 9/2005 |
| JP | 2009515351 A | 4/2009 |
| WO | 2004025517 A1 | 3/2004 |
| WO | 2009099280 A2 | 8/2009 |

OTHER PUBLICATIONS

Hoggan, Eve, et al.; "Mobile Multi-Actuator Tactile Displays"; HAID; 2007; 12 pages.
Nakamura, Norio, et al.; "Development of a Force and Torque Hybrid Display "GyroGubeSick""; IEEE; 2005; 2 pages.
European Extended Search Report; Application No. 14184405.0; Jan. 21, 2015; 13 pages.
Office Action dated Jul. 15, 2015; U.S. Appl. No. 13/952,137, filed Jul. 26, 2013; 34 pages.
Notice of Allowance dated Oct. 27, 2015; U.S. Appl. No. 13/952,137, filed Jul. 26, 2013; 10 pages.
Mankowski, Peter; U.S. Appl. No. 13/952,137; filed Jul. 26, 2013; Title: System and Method for Mainpulating an Object in a Three-Dimensional Desktop Environment.
http://wn.wikipedia.org/wiki/Autosteroscopy—published at least as early as Nov. 2010, pp. 1-5.
Canadian office action for corresponding Canadian Patent Application No. 2,708,673, dated Feb. 19, 2013, 2 pages.
European Search Report; Application No./Patent No. 13178166.8-1972; Date of Mailing: Jun. 13, 2014; pp. 1-12.
http://techon.nikkeibp.co.jp/english/NEWS_EN/20090310/166952/?P=11—published Mar. 11, 2009, pp. 1-2.
http://www.immersence.info/—published at least as early as Nov. 2010,1 sheet.
http://www.japantrends.com/tobidasu-3d-table-menu-from-tec/—published Mar. 12, 2008, pp. 1-3.
Korean first office action for Korean Patent Application No. 10-2010-0060536, dated Dec. 19, 2011, plus English transaction, 13 pages.
http://wn.wikipedia.org/wiki/Lenticular-lens—published at least as early as Nov. 2010, pp. 1-5.
http://silkehilsing.de/impress/blog/—published May 24, 2009, pp. 1-17.
http://singularityhub.com/2009/11/13/haptic-ring-lets-you-feel-objects-in-augmented-reality-video/—published Nov. 13, 2009, pp. 1-4.
https:/wiki.cc.gatech.edu/ccg/_media/classes/7570/7470-f06/gwpaper.pdf?id=classes:7570:7470-f06:projects_ii
&cache=cache—published at least as early as Nov. 2010, pp. 1-4.

* cited by examiner

THREE DIMENSIONAL HAPTICS HYBRID MODELING

BACKGROUND

Touch sensitive mobile devices may be used to provide haptic communications or communications that result in received tactile sensations. In such communications, a person may touch a screen of a first mobile device that is sensitive to a pressure with which the person touches the screen. The touch, its pressure, its motion along the screen, and other parameters related to the touching sensation are used to create and send a haptic signal to a second mobile device. The second mobile device receives the haptic signal and induces a motion or vibration at the second mobile device that is felt by a person holding the second mobile device. The type of vibration, intensity, character, direction, etc. at the second mobile device may be related to the particular movement at the screen of the first mobile device, the finger pressure, etc. In this way, it is possible for two individuals to "feel" each other over a communication network. However, this haptic communication is limited to actions that can be produced by contact with the screen of the mobile device.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
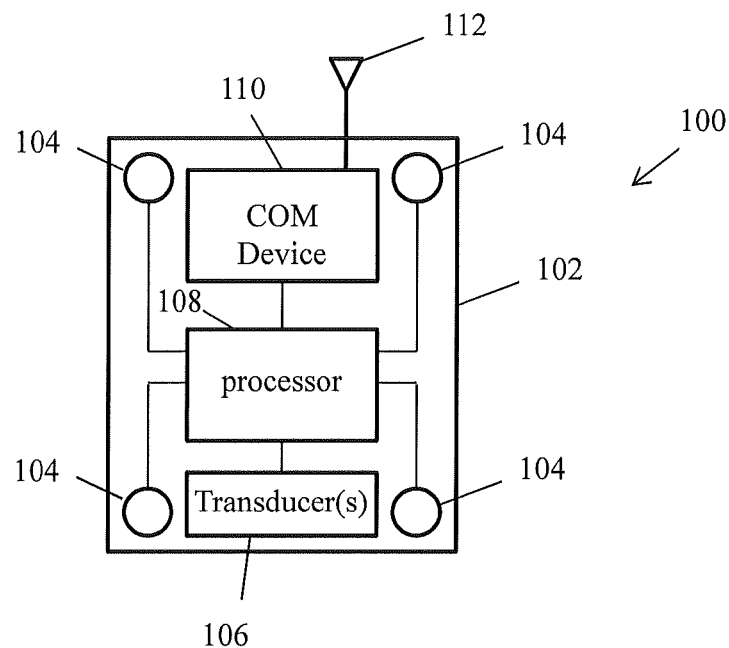
FIG. 1 shows a schematic circuit of a mobile device of the present invention suitable for providing three-dimensional haptic communication using the methods disclosed herein.

FIG. 1 shows a schematic circuit of a mobile cellular communication device ("mobile device") 100 of the present invention suitable for providing three-dimensional haptic communication using the methods disclosed herein. In various embodiments, the mobile device 100 may be a smartphone having a video display, a tablet, or any hand-held cellular communication device. The mobile device 100 includes a housing 102 that includes a set of haptic actuators 104. The haptic actuators may be vibrating devices that may be configured to vibrate in a variety of modes. In one embodiment, a haptic actuator 104 may vibrate in one of 1024 possible modes. In an illustrative embodiment, the mobile device 100 includes four haptic actuators 104. However, this is not meant as a limitation of the mobile device, and any number of haptic actuators 104 may be included in the mobile device 100.

The mobile device 100 further includes one or more acoustic transducers 106 for determining a position of a user object in three-dimensional space with respect to the mobile device 100. The user object may be a hand or finger of a user or a stylus, pointer, wand, etc. The acoustic transducers 106 may also be used to determine an action or gesture performed by the user object in three-dimensional space. The acoustic transducers 106 may transmit an acoustic pulse and receive a reflection of the acoustic pulse from the user object. The reflected acoustic pulse is used along with the transmitted acoustic pulse at the processor 108 to determine a location of the user object as well as the action of gesture of the user object.

The mobile device 100 further includes a processor 108 for controlling the haptic communication. In one embodiment, the processor 108 determines a gesture or action of the user object in three-dimensional space using the signals provided by the acoustic transducers 106 and reflected by the user object. The processor 108 may then create a haptic signal corresponding to the determined gesture or action. The processor 108 may then send the haptic signal via communication device 110 and antenna 112 to a second mobile device over a communication network. In another embodiment, a haptic signal may be received at the mobile device 100 via antenna 112 and communication device 110. The processor 108 may then actuate one or more of the haptic actuators 104 based on the received haptic signal. Thus, the mobile device 100 may be used either to generate a haptic signal based on a user action and send the generated haptic signal to another mobile device or to receive a haptic signal and generate a haptic event or haptic sensation at the mobile device 100 based on the received haptic signal, or both.

Figure 2:
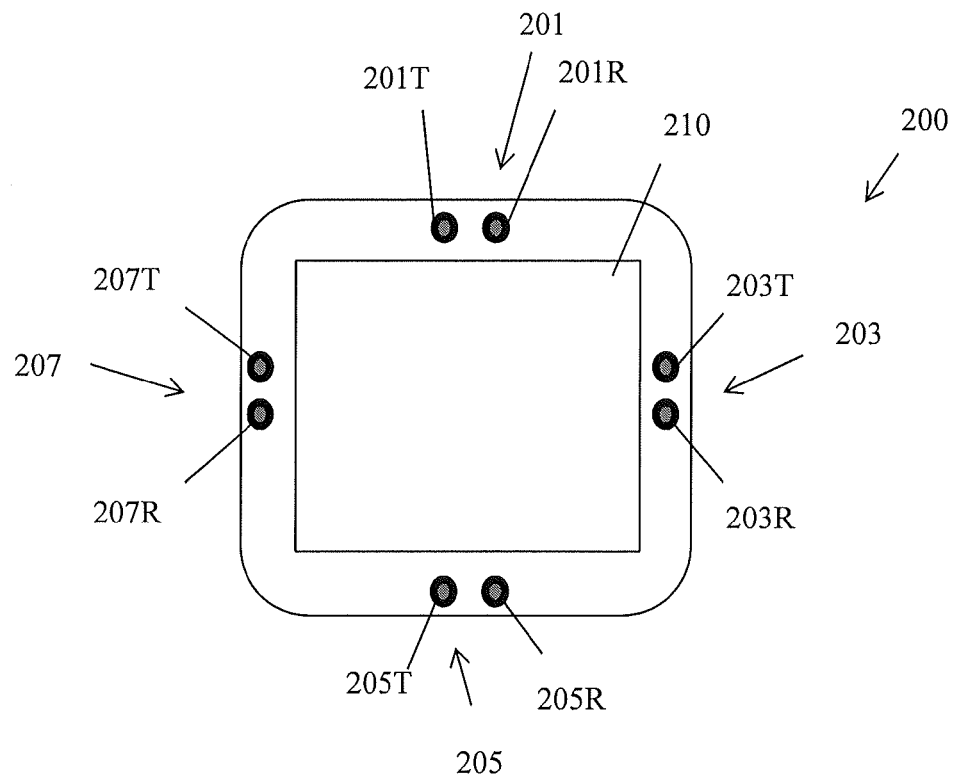
FIG. 2 shows a display of the illustrative mobile device of FIG. 1 in one embodiment of the present invention.

FIG. 2 shows a display 200 of the illustrative mobile device 100 in one embodiment of the present invention. The mobile device 100 may include a touch-sensitive or pressure-sensitive screen 210 that may be used to sense a pressure when a user object is in contact with the screen 210 or within a sufficiently close distance to induce a pressure or detectable interaction at the screen, such as by electrostatic interaction, moisture sensing, etc. The amount of pressure may be translated to a haptic signal that may be transmitted to another mobile device to create a haptic event at the other mobile device. The display 200 also has ultrasonic transducers 201, 203, 205 and 207 embedded therein that are configured to transmit and receive ultrasonic signals used for determining a location of a user object in real space with respect to the mobile device 100. The ultrasonic transducers 201, 203, 205 and 207 are used to determine the user action or user gesture of the user object when the user object is away from the screen 210, i.e., at a distance from the screen 210 so that the user object does not contact the screen 210 or does not create a response at the screen related to a close proximity of the user object to the screen 210, e.g., electrostatic interaction, etc. The transducers 201, 203, 205 and 207 are generally disposed along an edge of the screen 210 or along the perimeter of the display 200. Transducer 201 includes a transmitter 201T and a receiver 201R. Similarly, transducer 203 includes transmitter 203T and receiver 203R, transducer 205 includes transmitter 205T and receiver 205R, and transducer 207 includes transmitter 207T and receiver 207R. In alternative embodiments, one or more of transducers 201, 203, 203 and 207 may include a single acoustic device that alternates between operating in a transmitter mode and operating in a receiver mode. Although four transducers are shown in FIG. 2 for illustrative purposes, any number of transducers may be used in alternate embodiments. Additionally, increasing the number of transducers increases a spatial resolution of the three-dimensional space within which the user object moves.

Figure 3:
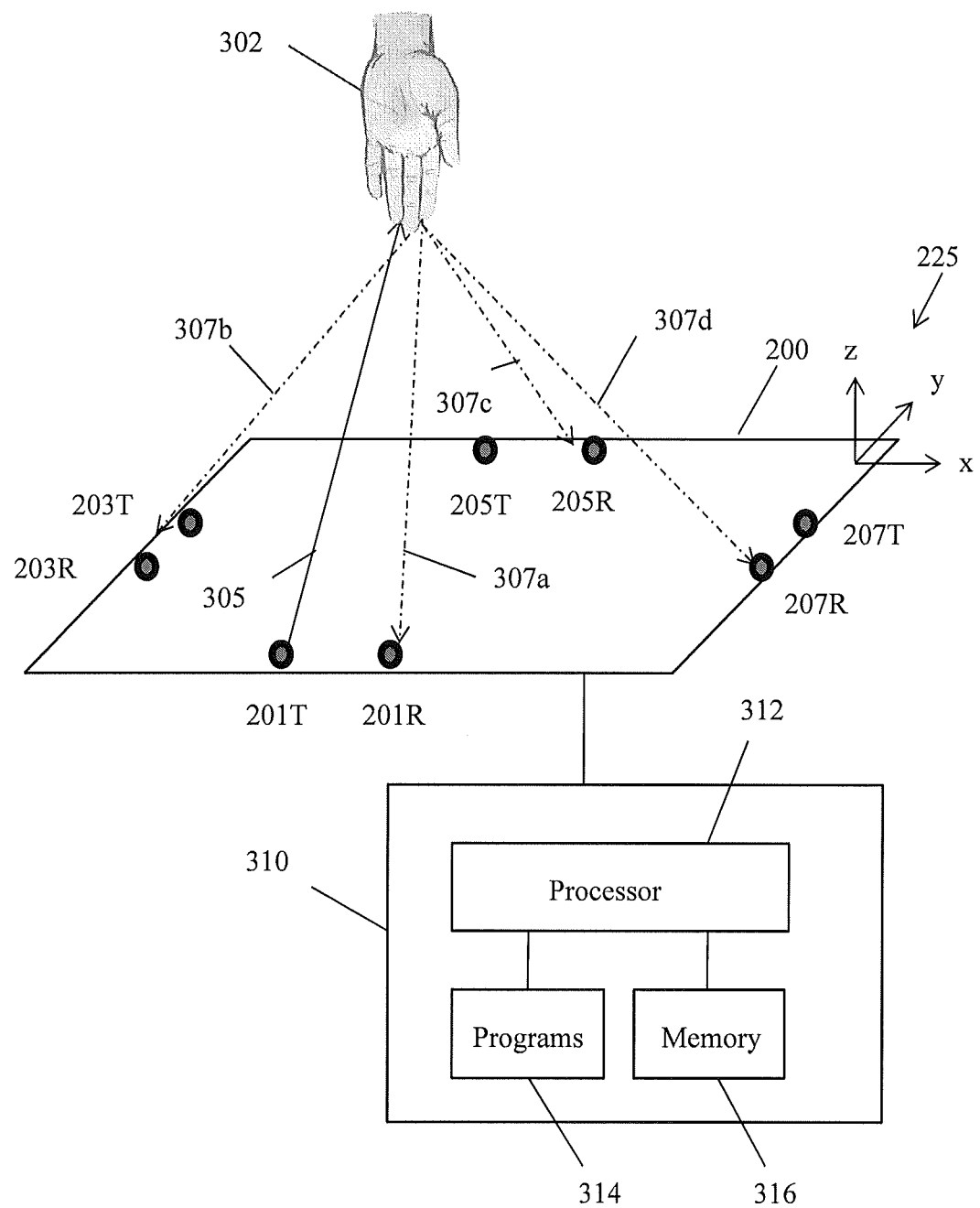
FIG. 3 illustrates a transducer configuration of the mobile device for determining a location of a user object or a user gesture of the user object with respect to the mobile device.

FIG. 3 illustrates use of the transducer configuration of FIG. 2 to determine a location of a user object 302 or a user gesture of the user object with respect to display 200. A coordinate system 225 may be defined over the space in front of the display 200. For illustrative purposes, a z-direction of the coordinate system 225 extends perpendicularly out of the display 200, with z=0 defined at a surface of the display 200. The x-direction is generally oriented along a horizontal axis of the display 200 and the y-direction is generally oriented along a vertical axis of the display 200.

Display 200 may be coupled to a control module 310 including a processor 312, programs 314 and memory location 316. Transducer signals may be processed at the processor 312 according to various programs 314 in order to perform various actions of the disclosure, including determining a relative location of the user object 302 with respect to display 200, determining an action, movement or an gesture made by the user object 302 and creating a haptic signal based on the determined action, movement or gesture. Various transducer signal times, transducer activation schedules, etc., may be stored at the memory location 316. In order to locate the user object 302, transmitter 201T generates an ultrasonic pulse 305 at a selected time, which time is recorded by the control module 310. The generated ultrasonic pulse 305 is propagated into the three-dimensional space in front of the display 200. The user object 302 in the space in front of the display 200 reflects the generated ultrasonic pulse to create a reflected ultrasonic pulse 307a which propagates back towards the display 200. Receiver 201R receives the reflected ultrasonic pulse 307a, and records a time at which the reflected ultrasonic pulse 307a is received. Processor 312 determines a time difference between the time at which the ultrasonic pulse 305 is propagated by the transmitter 201T into the three-dimensional space and the time at which the reflected ultrasonic pulse 307a is received by the receiver 201R, and determines a perpendicular distance along the z-axis between the display 200 and the user object 302 based on the determined time and a known speed of sound.

Additionally, receivers 203R, 205R and 207R of the other transducers 203, 205 and 207 may receive reflected ultrasonic pulses 307b, 307c and 307d, respectively, that corresponds to reflection of the generated ultrasonic pulse 305 from the user object 302. Time delays between generating the ultrasonic pulse 305 and receiving the reflected ultrasonic pulses 307b, 307c and 307d may also be recorded. Due to known spatial distances between transmitter 201T and receivers 203R, 205R and 207R, time delays determined for each of these transmitter-receiver pairings may be used to determine a horizontal and vertical distance (i.e., x-coordinate and y-coordinate) of the user object 302 with respect to the display 200.

In addition to measuring reflected pulses that are based on the ultrasonic pulse generated at transmitter 201T, this method of determining a spatial relation of the user object to the display may be implemented using the other transmitters 203T, 205T and 207T. Thus, the transmitters and receivers of each ultrasonic transducer 201, 203, 205 and 207 may be used in any suitable combination to determine the location of the user object 302. Additionally, transmitters 201T, 203T, 205T and 207T may be activated in a selected pattern. In one embodiment, the relative location of the user object 302 may be determined by triangulation of the distances determined using any or all of the ultrasonic transducers 201, 203, 205 and 207.

In addition to determining a location of the user object 302, the signals transmitted and received by ultrasonic transducers 201, 203, 205 and 207 may be used to determine a user action or user gesture by the user object 302 in three-dimensional space. In general, the location of the user object is obtained over a time interval and changes in the location or position of the user object over the time interval may be used to determine the user action, movement or gesture. A user action may include, for example, a motion of the user object 302 with respect to the device 110, and/or a gesture or movement of the user object 302. Examples of user actions or gestures may include a hand shake, a circular motion in the air, a punch directed toward the screen, a head bob, etc. The processor 312 may interpret the user action and create a haptic signal based upon the user action.

Figure 4:
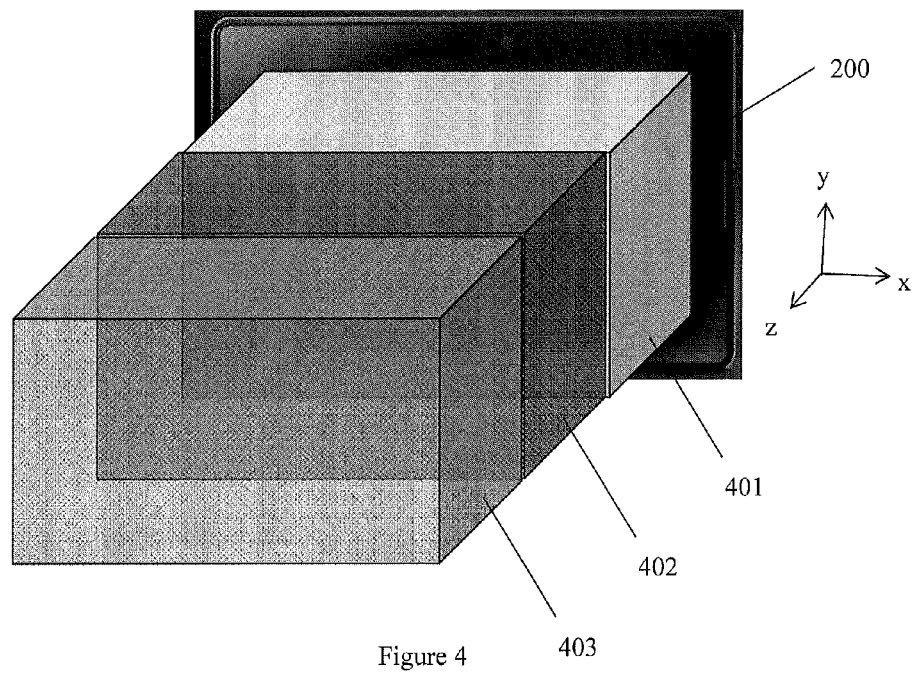
FIG. 4 shows an organizational structure of a space in front of the a display of a mobile device.

FIG. 4 shows an organizational structure of a space in front of the display 200 of FIGS. 2 and 3. The three-dimensional space is segmented into a plurality of illustrative "power" levels 401, 402 and 403, wherein each level spans a range of distances from the display 200 along the z-axis. The number of power levels and a spatial extent of a selected power level may be a pre-set parameter of the desktop environment such as 7 power levels or 20 power levels. Power levels may be used to provide a three-dimensional volume with respect to the display 200 within which a user action or gesture may be interpreted for the purposes of creating a haptic signal. Additionally, a power level may be subdivided into sub-groups or sub-volumes of the power level.

Figure 5:
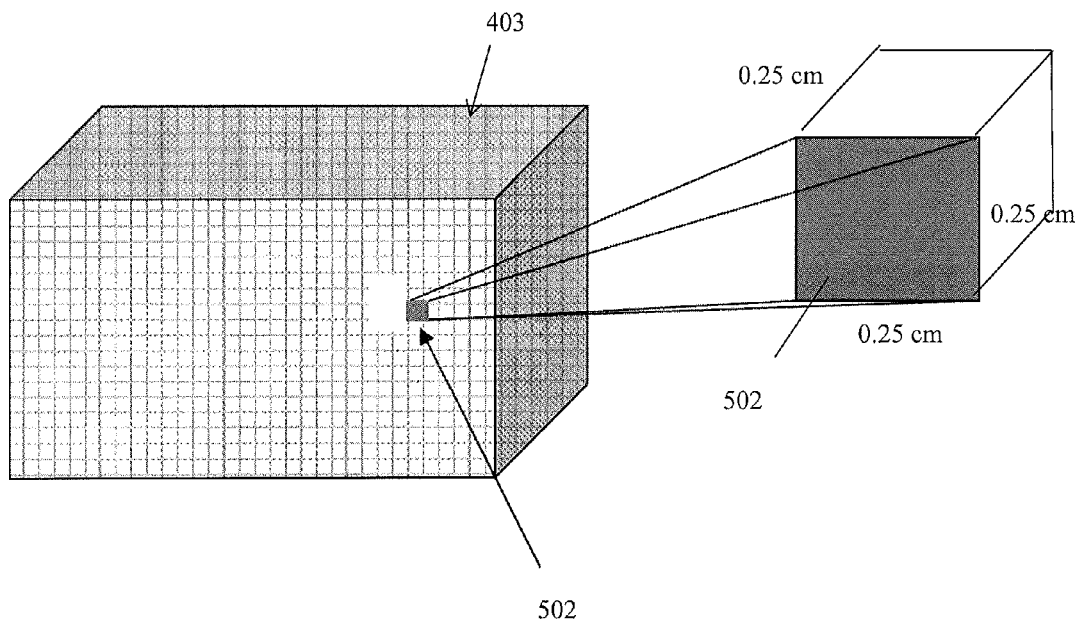
FIG. 5 shows an expanded view of a power level of the space in front of the mobile device.

FIG. 5 shows an expanded view of illustrative power level 403 of the space in front of the mobile device. The illustrative level 403 may include various pixelated volumes or pixel volumes 502. The size of a pixel volume 602 may be selected or pre-programmed at the device according to a resolution capability of the ultrasonic transducers. In the illustrative power level 403, a horizontal extent of pixel volume 502 is about 0.25 centimeters (cm), a vertical extent of pixel volume 602 is about 0.25 cm, and a thickness or depth of pixel volume 602 is about 0.25 cm. Increasing the number of ultrasonic transducers at the display 200 enables smaller pixel volumes 402, thereby increasing the resolution of the three-dimensional space. The pixel volumes may be used to provide resolution to the power level capable of enabling the processor to sufficiently determine or interpret a user gesture or user action.

Figure 6:
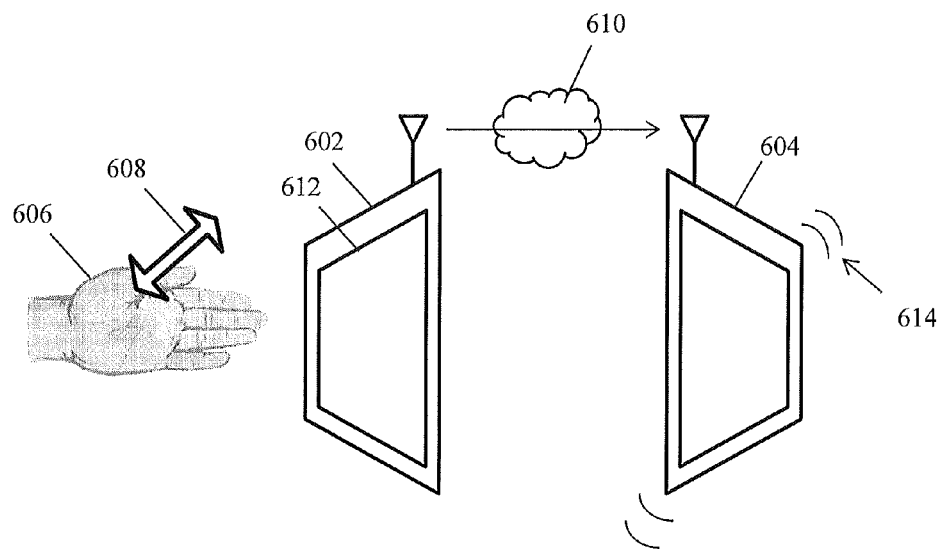
FIG. 6 illustrates an exemplary haptic communication in one embodiment.

FIG. 6 illustrates an exemplary haptic communication in one embodiment. A first mobile device 602 and a second mobile device 604 communicate with each other over a communication network 610, such as a cellular communication network. A user object 606, such as a hand, performs an action or gesture 608 in a three-dimensional space in front of the screen 612 of the first mobile device 602. The first mobile device 602 determines the user action or gesture 608 and creates a haptic signal that corresponds with the user action or gesture 608. The haptic signal is then communicated from the first mobile device 602 over the communication network 610 to the second mobile device 604. The second mobile device 604 then receives the haptic signal and performs a haptic event 614 that corresponds to the haptic signal and by extension to the action or gesture 608 performed by the user object 606 at the first mobile device 602.

Figure 7:
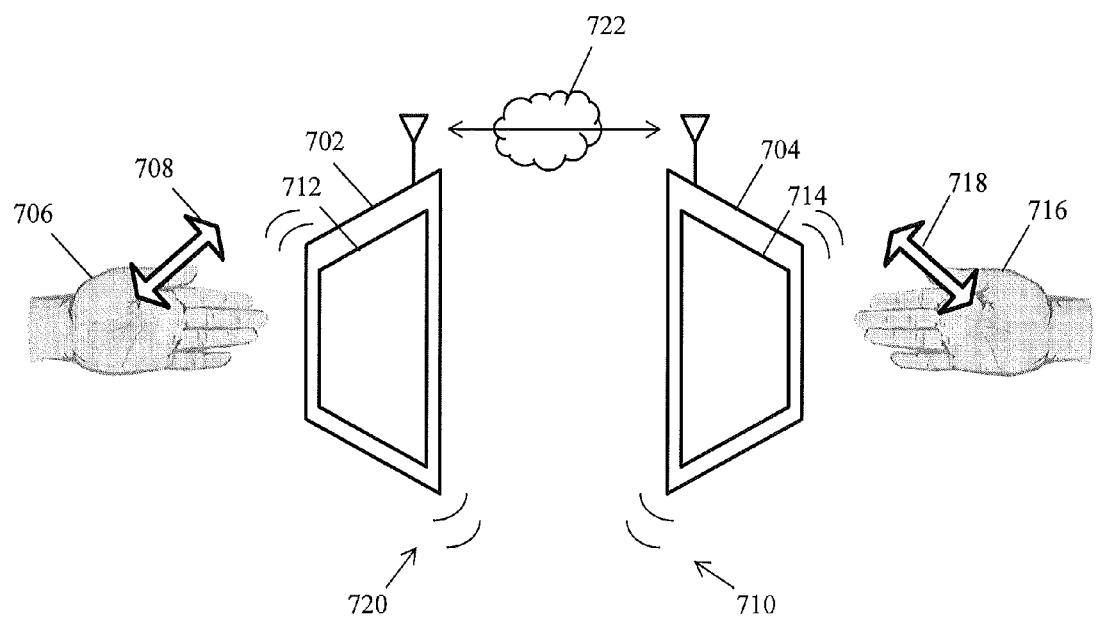
FIG. 7 illustrate another haptic communication in another embodiment.

FIG. 7 illustrate another haptic communication in another embodiment. A first user uses first user object 706 to perform a first gesture 708 in front of screen 712 of first mobile device 702, and a second user uses second user object 716 to perform a second gesture 718 in front of screen 714 of a second mobile device 704. Corresponding haptic signals are created and sent over the communication network 722. The second mobile device 704 performs a haptic event 710 at the second mobile device 704 which corresponds to the first gesture 708 and which is felt or experienced by the second user. The first mobile device 702 performs a haptic event at the first mobile device 720 which corresponds to the second gesture 718 and which is felt or experienced by the first user. The haptic communication between the first user and the second user may be simultaneous or the first user and the second user may alternately send haptic signals back and forth to each other.

Figure 8A:
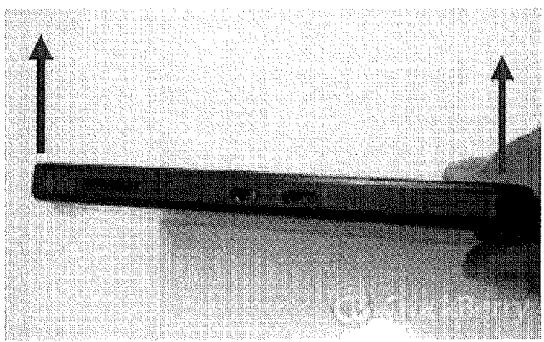
FIGS. 8A-8D illustrates various haptic events that may occur at a mobile device.
Figure 8B:
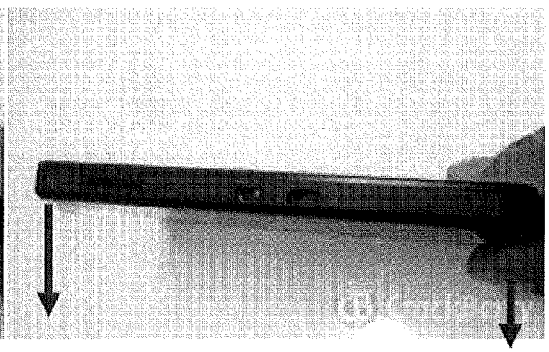
Figure 8C:
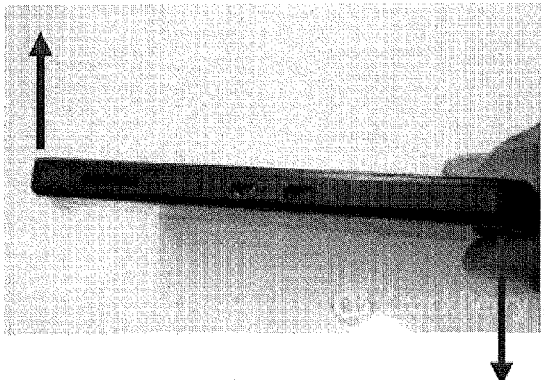
Figure 8D:
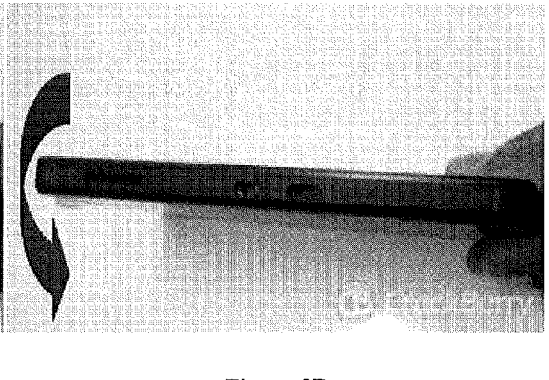

FIGS. 8A-8D illustrate various haptic events that may occur at a mobile device. FIG. 8A illustrates a haptic sensation of the mobile device getting lighter. FIG. 8B illustrates a haptic sensation of the mobile device becoming heavier. FIG. 8C illustrates a haptic sensation of the mobile device rotating about one axis. FIG. 8D illustrates a haptic sensation of the mobile device rotating about another axis. The haptic sensation may be a sensation experienced by the user holding the mobile device, but may be unrelated to an actual activity of the mobile device. For example, while the user may have a sensation that the mobile device is getting lighter, the mobile device itself is not becoming lighter, but the haptic actuator vibrations lead the user to believe that the mobile device is getting lighter.

The various haptic sensations may be combined in various combinations to provide selected haptic experiences. For example, a user may provide a virtual massage to another user over the communication network. In addition, a punching force may be delivered from one user to another. For example, the first user may perform a punch gesture in mid-air in front of the display of the first mobile device and the punch gesture may then be "felt" by the receiver at the second mobile device.

While the invention has been discussed with respect to providing a haptic event in response to a three-dimensional user action or user gesture, the invention also may include sending haptic signals related to pressure-induced or touch-induced responses created by touching the screen of the display. A communicated haptic signal sent from a first mobile device to a second mobile device may in one embodiment be a combination of a haptic signal related to a three-dimensional user action with a haptic signal related to a touching of the screen of the first mobile device. The haptic sensation at the second mobile device may thus be related to the three-dimensional user action and the various touch parameters recorded at the screen of the first mobile device. Additionally, the haptic signal may be sent in a data frame that includes non-haptic signals such as, for example, an audio signal, a visual signal, a text message signal, etc.

Figure 9:
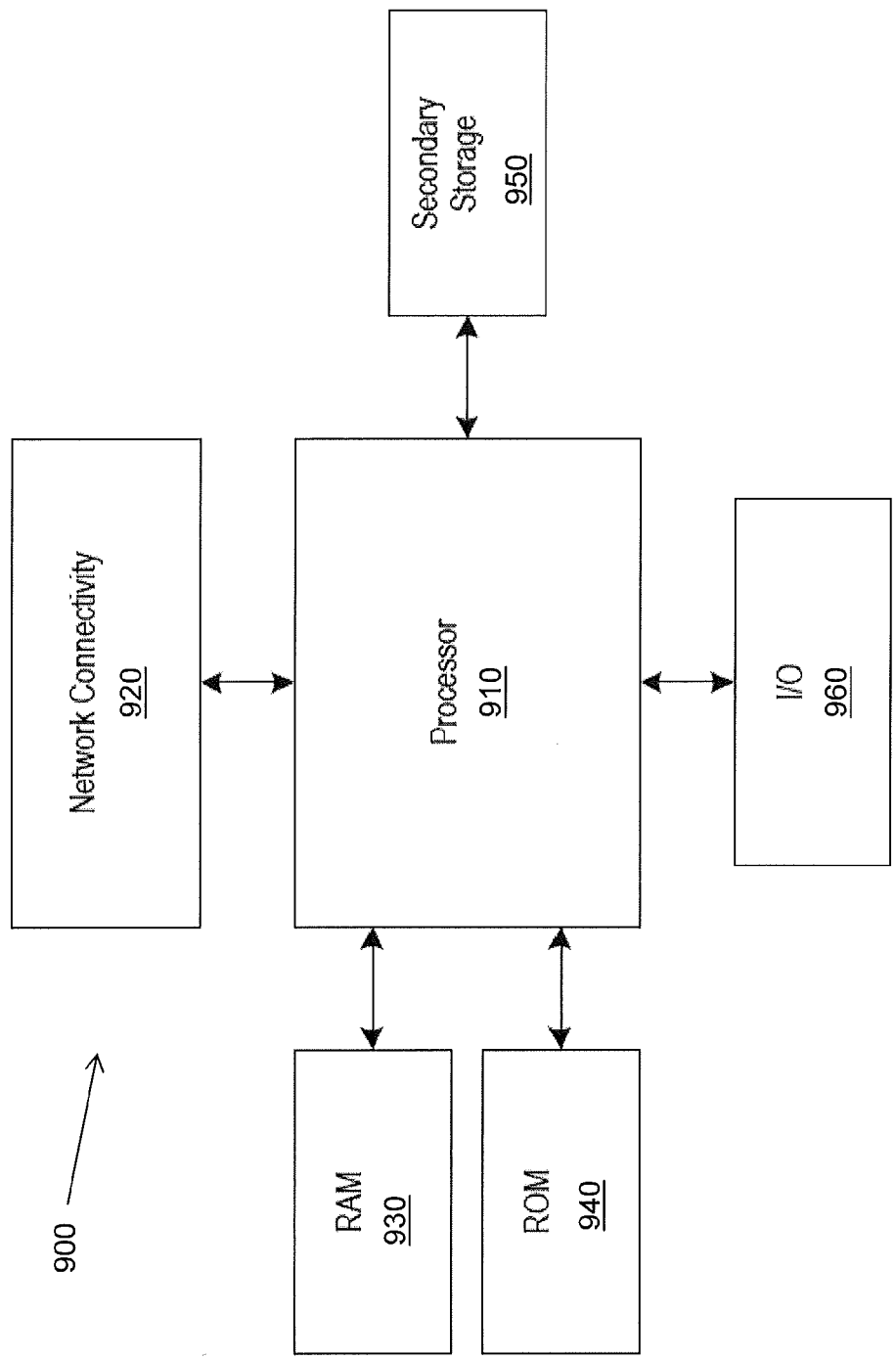
FIG. 9 illustrates an example of a system suitable for implementing one or more embodiments disclosed herein.

FIG. 900 illustrates an example of a system 900 suitable for implementing one or more embodiments disclosed herein. In various embodiments, the system 900 comprises a processor 910, which may be referred to as a central processor unit (CPU) or digital signal processor (DSP), or Application Processor (AP), network connectivity interfaces 920, random access memory (RAM) 930, read only memory (ROM) 940, secondary storage 950, and input/output (I/O) devices 960. In some embodiments, some of these components may not be present or may be combined in various combinations with one another or with other components not shown. These components may be located in a single physical entity or in more than one physical entity. Any actions described herein as being taken by the processor 910 might be taken by the processor 910 alone or by the processor 910 in conjunction with one or more components shown or not shown in FIG. 9.

The processor 910 executes instructions, codes, computer programs, or scripts that it might access from the network connectivity interfaces 920, RAM 930, or ROM 940. While only one processor 910 is shown, multiple processors may be present. Thus, while instructions may be discussed as being executed by a processor 910, the instructions may be executed simultaneously, serially, or otherwise by one or multiple processors 910 implemented as one or more CPU chips.

In various embodiments, the network connectivity interfaces 920 may take the form of modems, modem banks, Ethernet devices, universal serial bus (USB) interface devices, serial interfaces, token ring devices, fiber distributed data interface (FDDI) devices, wireless local area network (WLAN) devices (including radio, optical or infra-red signals), radio transceiver devices such as code division multiple access (CDMA) devices, global system for mobile communications (GSM) radio transceiver devices, long term evolution (LTE) radio transceiver devices, worldwide interoperability for microwave access (WiMAX) devices, and/or other well-known interfaces for connecting to networks, including Personal Area Networks (PANs) such as Bluetooth. These network connectivity interfaces 920 may enable the processor 910 to communicate with the Internet or one or more telecommunications networks or other networks from which the processor 910 might receive information or to which the processor 910 might output information, and in some example, may enable devices to communicate acoustically-detected gestures to other devices to create haptic effects at the other devices.

The network connectivity interfaces 920 may also be capable of transmitting or receiving data wirelessly in the form of electromagnetic waves, such as radio frequency signals or microwave frequency signals. Information transmitted or received by the network connectivity interfaces 920 may include data that has been processed by the processor 910 or instructions that are to be executed by processor 910. The data may be ordered according to different sequences as may be desirable for either processing or generating the data or transmitting or receiving the data.

In various embodiments, the RAM 930 may be used to store volatile data and instructions that are executed by the processor 910. The ROM 940 shown in FIG. 9 may likewise be used to store instructions and data that is read during execution of the instructions. The secondary storage 950 is typically comprised of one or more disk drives, solid state drives, or tape drives and may be used for non-volatile storage of data or as an overflow data storage device if RAM 930 is not large enough to hold all working data. Secondary storage 950 may likewise be used to store programs that are loaded into RAM 930 when such programs are selected for execution. The I/O devices 960 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, track pads, voice recognizers, card readers, paper tape readers, printers, video monitors, or other well-known input/output devices.

Figure 10:
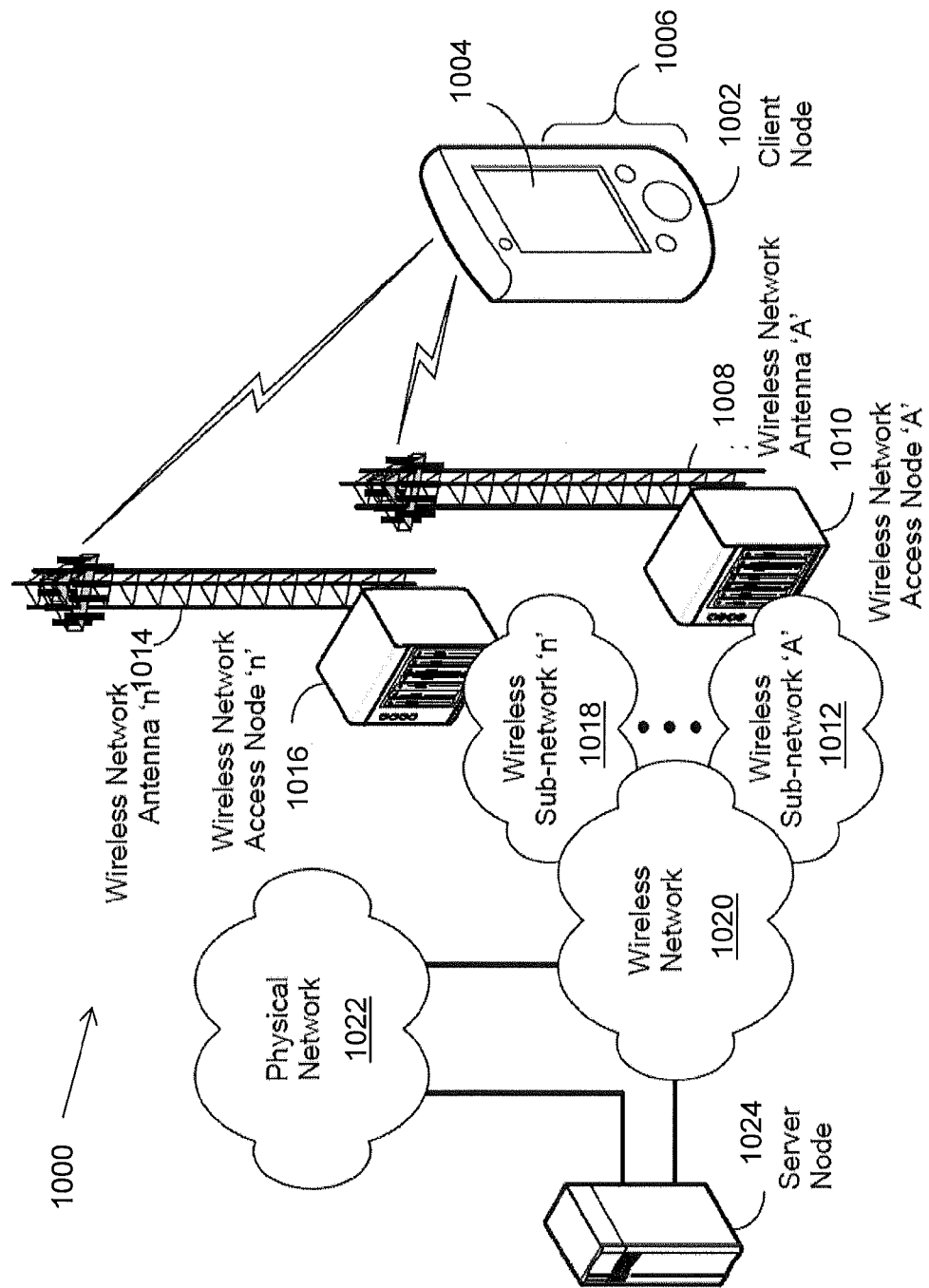
FIG. 10 shows a wireless-enabled communications environment including an embodiment of a client node as implemented in an embodiment of the disclosure.

FIG. 10 shows a wireless-enabled communications environment including an embodiment of a client node as implemented in an embodiment of the disclosure. Though illustrated as a mobile phone, the client node 1002 may take various forms including a wireless handset, a pager, a smart phone, or a personal digital assistant (PDA). In various embodiments, the client node 1002 may also comprise a portable computer, a tablet computer, a laptop computer, or any computing device operable to perform data communication operations, such as sending an receiving haptic signals. Many suitable devices combine some or all of these functions. In some embodiments, the client node 1002 is not a general purpose computing device like a portable, laptop, or tablet computer, but rather is a special-purpose communications device such as a telecommunications device installed in a vehicle. The client node 1002 may likewise be a device, include a device, or be included in a device that has similar capabilities but that is not transportable, such as a desktop computer, a set-top box, or a network node. In these and other embodiments, the client node 1002 may support specialized activities such as gaming, inventory control, job control, task management functions, and so forth.

In various embodiments, the client node 1002 includes a display 1004. In these and other embodiments, the client node 1002 may likewise include a touch-sensitive surface, a keyboard or other input keys 1006 generally used for input by a user. The input keys 1006 may likewise be a full or reduced alphanumeric keyboard such as QWERTY, DVORAK, AZERTY, and sequential keyboard types, or a traditional numeric keypad with alphabet letters associated with a telephone keypad. The input keys 1006 may likewise include a trackwheel, an exit or escape key, a trackball, and other navigational or functional keys, which may be moved to different positions, e.g., inwardly depressed, to provide further input function. The client node 1002 may likewise present options for the user to select, controls for the user to actuate, and cursors or other indicators for the user to direct.

The client node 1002 may further accept data entry from the user, including numbers to dial or various parameter values for configuring the operation of the client node 1002. The client node 1002 may further execute one or more software or firmware applications in response to user commands. These applications may configure the client node 1002 to perform various customized functions in response to user interaction. Additionally, the client node 1002 may be programmed or configured over-the-air (OTA), for example from a wireless network access node 'A' 1010 through 'n' 1016 (e.g., a base station), a server node 1024 (e.g., a host computer), or a peer client node 1002.

Among the various applications executable by the client node 1002 are a web browser, which enables the display 1004 to display a web page. The web page may be obtained from a server node 1024 through a wireless connection with a wireless network 1020. As used herein, a wireless network 1020 broadly refers to any network using at least one wireless connection between two of its nodes. The various applications may likewise be obtained from a peer client node 1002 or other system over a connection to the wireless network 1020 or any other wirelessly-enabled communication network or system.

In various embodiments, the wireless network 1020 comprises a plurality of wireless sub-networks (e.g., cells with corresponding coverage areas) 'A' 1012 through 'n' 1018. As used herein, the wireless sub-networks 'A' 1012 through 'n' 1018 may variously comprise a mobile wireless access network or a fixed wireless access network. In these and other embodiments, the client node 1002 transmits and receives communication signals, which are respectively communicated to and from the wireless network nodes 'A' 1010 through 'n' 1016 by wireless network antennas 'A' 1008 through 'n' 1014 (e.g., cell towers). In turn, the communication signals are used by the wireless network access nodes 'A' 1010 through 'n' 1016 to establish a wireless communication session with the client node 1002. As used herein, the network access nodes 'A' 1010 through 'n' 1016 broadly refer to any access node of a wireless network. As shown in FIG. 10, the wireless network access nodes 'A' 1010 through 'n' 1016 are respectively coupled to wireless sub-networks 'A' 1012 through 'n' 1018, which are in turn connected to the wireless network 1020.

In various embodiments, the wireless network 1020 is coupled to a core network 1022, e.g., a global computer network such as the Internet. Via the wireless network 1020 and the core network 1022, the client node 1002 has access to information on various hosts, such as the server node 1024. In these and other embodiments, the server node 1024 may provide content that may be shown on the display 1004 or used by the client node processor 910 for its operations. Alternatively, the client node 1002 may access the wireless network 1020 through a peer client node 1002 acting as an intermediary, in a relay type or hop type of connection. As another alternative, the client node 1002 may be tethered and obtain its data from a linked device that is connected to the wireless sub-network 1012. Skilled practitioners of the art will recognize that many such embodiments are possible and the foregoing is not intended to limit the spirit, scope, or intention of the disclosure.

Figure 11:
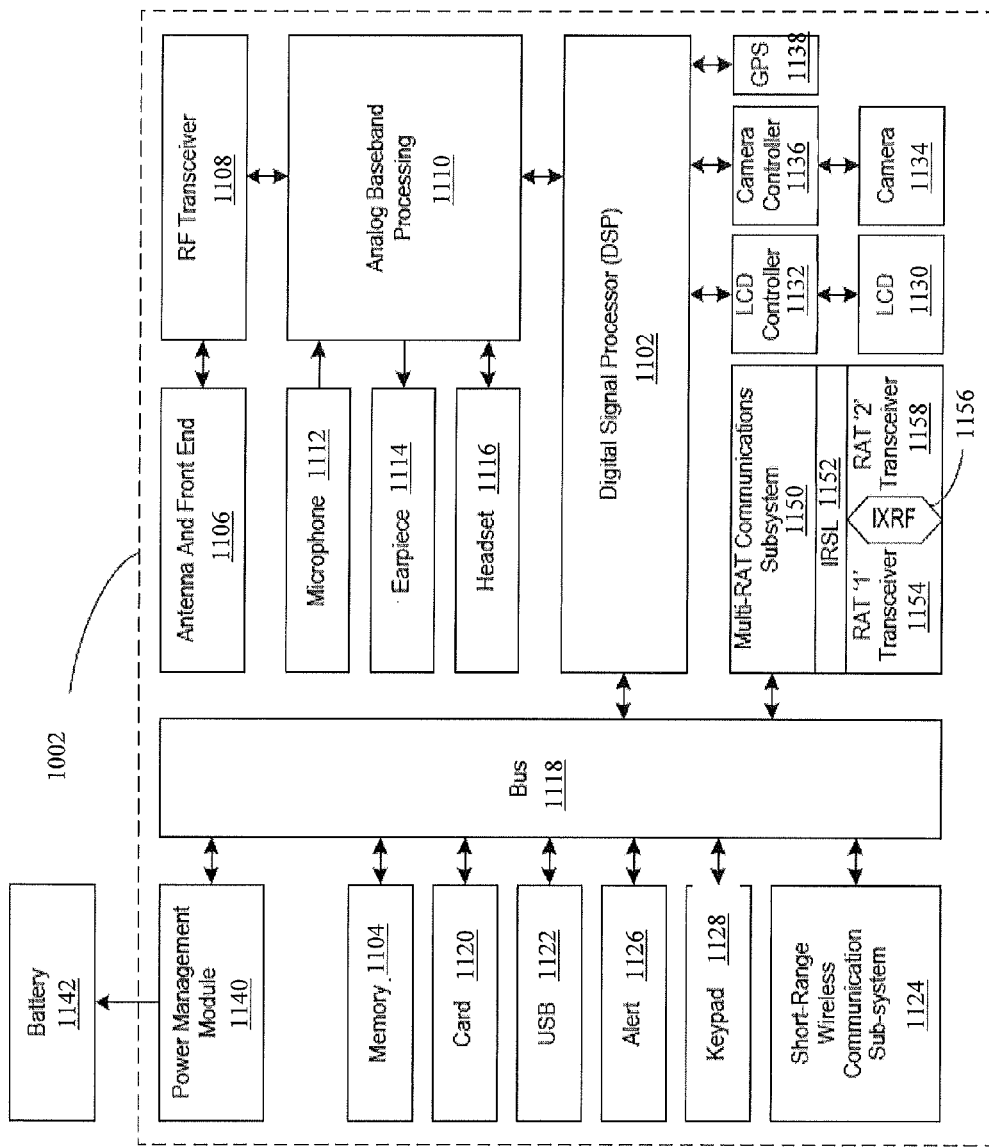
FIG. 11 depicts a block diagram of an exemplary client node as implemented with a digital signal processor (DSP) in accordance with an embodiment of the disclosure.

FIG. 11 depicts a block diagram of an exemplary client node as implemented with a digital signal processor (DSP) in accordance with an embodiment of the disclosure. While various components of a client node 1002 are depicted, various embodiments of the client node 1002 may include a subset of the listed components or additional components not listed. As shown in FIG. 11, the client node 1002 includes a DSP 1102 and a memory 1104. As shown, the client node 1002 may further include an antenna and front end unit 1106, a radio frequency (RF) transceiver 1108, an analog baseband processing unit 1110, a microphone 1112, an earpiece speaker 1114, a headset port 1116, a bus 1118, such as a system bus or an input/output (I/O) interface bus, a removable memory card 1120, a universal serial bus (USB) port 1122, a short range wireless communication sub-system 1124, an alert 1126, a keypad 1128, a liquid crystal display (LCD) 1130, which may include a touch sensitive surface, an LCD controller 1132, a charge-coupled device (CCD) camera 1134, a camera controller 1136, and a global positioning system (GPS) sensor 1138, and a power management module 1140 operably coupled to a power storage unit, such as a battery 1142. In various embodiments, the client node 1002 may include another kind of display that does not provide a touch sensitive screen. In one embodiment, the DSP 1102 communicates directly with the memory 1104 without passing through the input/output interface ("Bus") 1118.

In various embodiments, the DSP 1102 or some other form of controller or central processing unit (CPU) operates to control the various components of the client node 1002 in accordance with embedded software or firmware stored in memory 1104 or stored in memory contained within the DSP 1102 itself. In addition to the embedded software or firmware, the DSP 1102 may execute other applications stored in the memory 1104 or made available via information media such as portable data storage media like the removable memory card 1120 or via wired or wireless network communications. The application software may comprise a compiled set of machine-readable instructions that configure the DSP 1102 to provide the desired functionality, or the application software may be high-level software instructions to be processed by an interpreter or compiler to indirectly configure the DSP 1102.

The antenna and front end unit 1106 may be provided to convert between wireless signals and electrical signals, enabling the client node 1002 to send and receive information from a cellular network or some other available wireless communications network or from a peer client node 1002. In an embodiment, the antenna and front end unit 1106 may include multiple antennas to support beam forming and/or multiple input multiple output (MIMO) operations. As is known to those skilled in the art, MIMO operations may provide spatial diversity, which can be used to overcome difficult channel conditions or to increase channel throughput. Likewise, the antenna and front-end unit 1106 may include antenna tuning or impedance matching components, RF power amplifiers, or low noise amplifiers.

In various embodiments, the RF transceiver 1108 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 1110 or the DSP 1102 or other central processing unit. In some embodiments, the RF Transceiver 1108, portions of the Antenna and Front End 1106, and the analog base band processing unit 1110 may be combined in one or more processing units and/or application specific integrated circuits (ASICs).

Note that in this diagram the radio access technology (RAT) RAT1 and RAT2 transceivers 1154, 1158, the IXRF 1156, the IRSL 1152 and Multi-RAT subsystem 1150 are operably coupled to the RF transceiver 1108 and analog baseband processing unit 1110 and then also coupled to the antenna and front end 1106 via the RF transceiver 1108. As there may be multiple RAT transceivers, there will typically be multiple antennas or front ends 1106 or RF transceivers 1108, one for each RAT or band of operation.

The analog baseband processing unit 1110 may provide various analog processing of inputs and outputs for the RF transceivers 1108 and the speech interfaces (1112, 1114, 1116). For example, the analog baseband processing unit 1110 receives inputs from the microphone 1112 and the headset 1116 and provides outputs to the earpiece 1114 and the headset 1116. To that end, the analog baseband processing unit 1110 may have ports for connecting to the built-in microphone 1112 and the earpiece speaker 1114 that enable the client node 1002 to be used as a cell phone. The analog baseband processing unit 1110 may further include a port for connecting to a headset or other hands-free microphone and speaker configuration. The analog baseband processing unit 1110 may provide digital-to-analog conversion in one signal direction and analog-to-digital conversion in the opposing signal direction. In various embodiments, at least some of the functionality of the analog baseband processing unit 1110 may be provided by digital processing components, for example by the DSP 1102 or by other central processing units.

The DSP 1102 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 1102 may perform modulation, coding, interleaving, and spreading, and for a receiver function the DSP 1102 may perform despreading, deinterleaving, decoding, and demodulation. In another embodiment, for example in an orthogonal frequency division multiplex access (OFDMA) technology application, for the transmitter function the DSP 1102 may perform modulation, coding, interleaving, inverse fast Fourier transforming, and cyclic prefix appending, and for a receiver function the DSP 1102 may perform cyclic prefix removal, fast Fourier transforming, deinterleaving, decoding, and demodulation. In other wireless technology applications, yet other signal processing functions and combinations of signal processing functions may be performed by the DSP 1102.

The DSP 1102 may communicate with a wireless network via the analog baseband processing unit 1110. In some embodiments, the communication may provide Internet connectivity, enabling a user to gain access to content on the Internet and to send and receive e-mail or text messages. The input/output interface 1118 interconnects the DSP 1102 and various memories and interfaces. The memory 1104 and the removable memory card 1120 may provide software and data to configure the operation of the DSP 1102. Among the interfaces may be the USB interface 1122 and the short range wireless communication sub-system 1124. The USB interface 1122 may be used to charge the client node 1002 and may also enable the client node 1002 to function as a peripheral device to exchange information with a personal computer or other computer system. The short range wireless communication sub-system 1124 may include an infrared port, a Bluetooth interface, an IEEE 802.11 compliant wireless interface, or any other short range wireless communication sub-system, which may enable the client node 1002 to communicate wirelessly with other nearby client nodes and access nodes. The short-range wireless communication Sub-system 1124 may also include suitable RF Transceiver, Antenna and Front End subsystems.

The input/output interface ("Bus") 1118 may further connect the DSP 1102 to the alert 1126 that, when triggered, causes the client node 1002 to provide a notice to the user, for example, by ringing, playing a melody, or vibrating. The alert 1126 may serve as a mechanism for alerting the user to any of various events such as an incoming call, a new text message, and an appointment reminder by silently vibrating, or by playing a specific pre-assigned melody for a particular caller.

The keypad 1128 couples to the DSP 1102 via the I/O interface ("Bus") 1118 to provide one mechanism for the user to make selections, enter information, and otherwise provide input to the client node 1002. The keyboard 1128 may be a full or reduced alphanumeric keyboard such as QWERTY, DVORAK, AZERTY and sequential types, or a traditional numeric keypad with alphabet letters associated with a telephone keypad. The input keys may likewise include a trackwheel, track pad, an exit or escape key, a trackball, and other navigational or functional keys, which may be inwardly depressed to provide further input function. Another input mechanism may be the LCD 1130, which may include touch screen capability and also display text and/or graphics to the user. The LCD controller 1132 couples the DSP 1102 to the LCD 1130. Yet another input mechanism includes acoustic transducers that transmit acoustic signals and receive reflections of the transmitted signals from an object to determine a location, action, movement and/or gesture of the object which may be used to generate haptic signals for producing haptic events or haptic sensations at other devices.

The CCD camera 1134, if equipped, enables the client node 1002 to make digital pictures. The DSP 1002 communicates with the CCD camera 1134 via the camera controller 1136. In another embodiment, a camera operating according to a technology other than Charge Coupled Device cameras may be employed. The GPS sensor 1138 is coupled to the DSP 1102 to decode global positioning system signals or other navigational signals, thereby enabling the client node 1002 to determine its position. The GPS sensor 1138 may be coupled to an antenna and front end (not shown) suitable for its band of operation. Various other peripherals may also be included to provide additional functions, such as radio and television reception.

In various embodiments, the client node (e.g., 1002) comprises a first Radio Access Technology (RAT) transceiver 1154 and a second RAT transceiver 1158. As shown in FIG. 11, and described in greater detail herein, the RAT transceivers '1' 1154 and '2' 1158 are in turn coupled to a multi-RAT communications subsystem 1150 by an Inter-RAT Supervisory Layer Module 1152. In turn, the multi-RAT communications subsystem 1150 is operably coupled to the Bus 1118. Optionally, the respective radio protocol layers of the first Radio Access Technology (RAT) transceiver 1154 and the second RAT transceiver 1158 are operably coupled to one another through an Inter-RAT eXchange Function (IRXF) Module 1156.

In various embodiments, the network node (e.g. 1024) acting as a server comprises a first communication link corresponding to data to/from the first RAT and a second communication link corresponding to data to/from the second RAT.

Therefore, in accordance with one aspect of the disclosure, a method of producing a haptic sensation includes: using an acoustic transducer at a first cellular communication device to determine a first gesture with respect to a first cellular communication device; sending a first haptic signal from the first cellular communication device to a second cellular communication device; and actuating at least one actuator at the second cellular communication device according to the first haptic signal to produce a haptic sensation at the second cellular communication device.

In accordance with another aspect of the disclosure, an apparatus for haptic communication includes: at least one acoustic transducer configured to generate an acoustic signal and receive a reflection of the acoustic signal from an object in three-dimensional space; a processor configured to determine a movement of the object from the received acoustic signal and generate a haptic signal based on the determined movement; and a communication circuit configured to send the haptic signal to a device to produce a haptic sensation at the device.

In accordance with yet another aspect of the disclosure, a system for haptic communication includes: a first communication device and a second communication device in communication with each other; an acoustic transducer of the first communication device configured to generate an acoustic signal and receive a reflection of the generated acoustic signal; a first processor of the first communication device configured to generate a first haptic signal that corresponds to the received reflections of the generated acoustic signal; at least one actuator of the second communication device; and a second processor of the second communication device configured to received the first haptic signal from the first communication device and actuate the at least one actuator to produce a haptic sensation at the second communication device that corresponds to the received acoustic signal at the first communication device.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of producing a haptic sensation, comprising:
using a plurality of acoustic transducers at a first cellular communication device to determine a first gesture by an object moving within a three-dimensional space in front of a display on the first cellular communication device, wherein the three-dimensional space is segmented into a plurality of spatial levels spanning a range of distances from the display along a first axis, each spatial level including pixel volumes sized according to a resolution capability of the acoustic transducers, wherein the pixel volumes are configured to provide resolution to power levels for determining the first gesture;
sending a first haptic signal from the first cellular communication device to a second cellular communication device; and
actuating at least one actuator at the second cellular communication device according to the first haptic signal to produce a haptic sensation at the second cellular communication device.

2. The method of claim 1, further comprising using an acoustic transducer at the second cellular communication device to determine a second gesture with respect to the second cellular communication device; sending a second haptic signal from the second cellular communication device to the first cellular communication device; and actuating at least one actuator at the first cellular communication device according to the second haptic signal to produce a haptic sensation at the first cellular communication device.

3. The method of claim 1, wherein the first gesture is performed by the object in the three-dimensional space at a location away from a screen of the first cellular communication device.

4. The method of claim 1, wherein the haptic signal is sent from the first cellular communication device to the second cellular communication device in a data frame that includes at least one of: (i) an audio signal; (ii) a visual signal; and (iii) a text message signal.

5. The method of claim 1, further comprising determining horizontal and vertical distances between each acoustic transducer and the object based on ultrasonic pulses generated and received by the acoustic transducers, and triangulating the horizontal and vertical distances to determine a relative location of the object, wherein the plurality of acoustic transducers comprise only four actuators embedded along a perimeter of the display.

6. The method of claim 1, wherein the haptic sensation further includes at least one of: a sensation of a translation of the second cellular communication device in a selected direction; and a sensation of a rotation of the second cellular communication device about a selected axis.

7. An apparatus for haptic communication, comprising:
at least one acoustic transducer comprising a transmitter and a receiver, the transmitter configured to generate an acoustic signal that propagates away from a display of the apparatus and towards an object in touchless communication with the apparatus such that the receiver receives an ultrasonic pulse reflection from the object in a three-dimensional space within which movement of the object is detectable;
a processor configured to segment the three-dimensional space into a plurality of spatial levels spanning a range of distances from the display along a first axis, each spatial level including pixel volumes sized according to a resolution capability of the at least one acoustic transducer, wherein the pixel volumes are configured to provide resolution to power levels for enabling the processor to determine a movement of the object from at least the received ultrasonic pulse reflection and generate a haptic signal based on the determined movement; and
a communication circuit configured to send the haptic signal to a device to produce a haptic sensation at the device.

8. The apparatus of claim 7, wherein the processor is further configured to determine a location of the object based at least on a difference in time between propagating the acoustic signal into the three-dimensional space and receiving the ultrasonic pulse reflection, wherein the processor uses the location to determine a motion of the object, and wherein the generated haptic signal corresponds to the motion of the object.

9. The apparatus of claim 8, wherein the motion of the object is performed in the three-dimensional space at a distance away from inducing a pressure-sensitive signal at a screen on the display of the apparatus, wherein the processor determines a perpendicular distance along the first axis between the display and the object based on the difference in time and a known speed of sound, and wherein the perpendicular distance is used to detect a position of the object.

10. The apparatus of claim 7, further comprising at least one actuator, wherein the processor is configured to receive a haptic signal communicated to the apparatus and activate the at least one actuator to produce a haptic sensation corresponding to the received haptic signal.

11. The apparatus of claim 7, wherein the processor sends the haptic signal to the device in a data frame that includes at least one of: (i) an audio signal; (ii) a visual signal; and (iii) a text message signal.

12. The apparatus of claim 7, wherein the at least one acoustic transducer further comprises only four acoustic transducers embedded along a perimeter of the display, each acoustic transducer comprising a pair of transmitters and receivers for generating acoustic signals and receiving ultrasonic pulse reflections, wherein the processor records time delays between generating the acoustic signals and receiving the ultrasonic pulse reflections, and wherein the processor uses the time delays and known spatial distances between each of the four transmitter-receiver pairing to determine horizontal and vertical distances between the display and the object.

13. The apparatus of claim 7, wherein the haptic sensation further includes at least one of: a sensation of a translation of the device in a selected direction; and a sensation of a rotation of the device about a selected axis.

14. A system for haptic communication, comprising:
a first cellular communication device and a second cellular communication device in communication with each other;
an acoustic transducer of the first cellular communication device configured to generate an acoustic signal that propagates into a three-dimensional space away from the first cellular communication device and towards an object in front such that the at least one acoustic receiver receives an ultrasonic pulse reflection from the object;
a first processor of the first cellular communication device configured to segment the three-dimensional space into a plurality of spatial levels spanning a range of distances from the display along a first axis, each spatial level including pixel volumes sized according to a resolution capability of the at least one acoustic transducer, wherein the pixel volumes are configured to provide resolution to power levels for enabling the first processor to determine a gesture based on a first haptic signal that corresponds to the received reflections of the generated acoustic signal;
at least one actuator of the second cellular communication device; and
a second processor of the second cellular communication device configured to receive the first haptic signal from the first cellular communication device and actuate the at least one actuator to produce a haptic sensation at the second cellular communication device that corresponds to the received acoustic signal at the first cellular communication device.

15. The system of claim 14, wherein a motion of the object with respect to the first cellular communication device affects the reflected acoustic signal and the haptic sensation at the second cellular communication device corresponds to the motion of the object.

16. The system of claim 15, wherein the motion of the object is performed in the three-dimensional space at a distance away from inducing a pressure-sensitive signal at a screen of the first cellular communication device.

17. The system of claim 14, wherein the haptic signal is sent from the first cellular communication device to the second cellular communication device in a data frame that includes at least one of: (i) an audio signal; (ii) a visual signal; and (iii) a text message signal.

18. The system of claim 14, wherein the at least one actuator further comprises one of: three actuators; four actuators; and more than four actuators.

19. The system of claim 14, wherein the haptic sensation further includes at least one of: a sensation of a translation of the second cellular communication device in a selected direction; and a sensation of a rotation of the second cellular communication device about a selected axis.

20. The system of claim 14, further comprising a second acoustic transducer at the second cellular communication device and at least one actuator at the first cellular communication device and a second actuator at the second cellular communication device, wherein the second processor determines a second gesture from signals obtained using the second acoustic transducer and sends a second haptic signal from the second cellular communication device to the first cellular communication device over a cellular phone network; and the first processor actuates the actuator of the first cellular communication device according to the second haptic signal to produce a haptic sensation at the first cellular communication device.

\* \* \* \* \*